US012798328B2

(12) United States Patent
Henderson et al.

(10) Patent No.: US 12,798,328 B2
(45) Date of Patent: Nov. 17, 2026

(54) MULTI-STAGE FURNACE MODE FOR A RECREATIONAL VEHICLE AIR CIRCULATION SYSTEM

(71) Applicant: Haier US Appliance Solutions, Inc., Wilmington, DE (US)

(72) Inventors: Richard Dustin Henderson, LaGrange, KY (US); Kyle Howell, Louisville, KY (US); William Troyer, South Bend, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 182 days.

(21) Appl. No.: 18/809,923

(22) Filed: Aug. 20, 2024

(65) Prior Publication Data

US 2026/0054543 A1 Feb. 26, 2026

(51) Int. Cl.
*B60H 1/00* (2006.01)

(52) U.S. Cl.
CPC ..... *B60H 1/00807* (2013.01); *B60H 1/00021* (2013.01); *B60H 1/00364* (2013.01); *B60H 1/00828* (2013.01); *B60H 2001/00114* (2013.01)

(58) Field of Classification Search
CPC ............ B60H 1/00807; B60H 1/00021; B60H 1/00364; B60H 1/00828; B60H 2001/00114; B60H 2001/00221; B60H 1/00735; B60H 1/00778; B60H 1/00964; B60H 1/2218; B60H 1/00657
See application file for complete search history.

(56) References Cited

U.S. PATENT DOCUMENTS

| | | | | |
|---|---|---|---|---|
| 4,485,863 | A * | 12/1984 | Yoshida | B60H 1/00835 236/76 |
| 6,464,000 | B1 | 10/2002 | Kloster | |
| 11,787,267 | B2 | 10/2023 | Beaufrere et al. | |
| 2008/0000246 | A1 | 1/2008 | Ha et al. | |
| 2017/0211822 | A1* | 7/2017 | Perez | F23N 5/022 |
| 2017/0211834 | A1* | 7/2017 | Perez | F24F 11/0001 |
| 2022/0169091 | A1* | 6/2022 | Henderson | B60H 1/00364 |
| 2023/0098535 | A1* | 3/2023 | Scalf | B60H 1/00364 62/203 |

FOREIGN PATENT DOCUMENTS

| | | | | |
|---|---|---|---|---|
| CA | 2826346 | A1 * | 3/2014 | F24D 5/04 |
| CN | 107234940 | A | 10/2017 | |
| CN | 212746593 | U * | 3/2021 | |
| TW | 1839987 | B * | 4/2024 | |
| WO | WO-2022058390 | A1 * | 3/2022 | G05B 19/0428 |

* cited by examiner

*Primary Examiner* — Kun Kai Ma
(74) *Attorney, Agent, or Firm* — Dority & Manning, P.A.

(57) ABSTRACT

A method of operating an air circulation system for a recreational vehicle may include analyzing a temperature profile within a passenger compartment of the recreational vehicle. The method may include transmitting a pulse-input code to the furnace. The pulse-input code being based on the analyzed temperature profile. The method may include directing operational parameters of the furnace based on the transmitted pulse-input code.

18 Claims, 5 Drawing Sheets

MULTI-STAGE FURNACE MODE FOR A RECREATIONAL VEHICLE AIR CIRCULATION SYSTEM

FIELD OF THE DISCLOSURE

The present subject matter relates generally to a recreational vehicle air circulation system, and more particularly to a method of operating an air circulation system for a recreational vehicle.

BACKGROUND OF THE DISCLOSURE

Certain recreational vehicles include an air conditioner unit, referred to generally as a recreational vehicle air conditioner (RVAC), for maintaining a comfortable temperature within the passenger compartment. The air conditioning units are typically mounted on the roof or another exterior location of the recreational vehicle and utilize a sealed system for circulating refrigerant between an indoor and outdoor heat exchanger to facilitate heat transfer. For example, the indoor heat exchanger is positioned within an indoor portion of the RVAC and is in fluid communication with the passenger compartment through an opening in the roof. The outdoor heat exchanger is positioned within the outdoor portion and is separated from the indoor heat exchanger by a partition or divider.

In addition, recreational vehicles can include a furnace for heating the passenger compartment. The RVAC and the furnace can interface with an external display or control device, such as a thermostat, which receives a user input such as a set temperature. Some external display devices provide centralized control, where the display device has a relatively high degree of control of the RVAC or the furnace, which may include directly commanding components of the RVAC unit; such as one or more fans, furnaces/heaters, or a compressor; to turn on or off. However, further improvements are necessary to improve recreational vehicles. Particularly, recreational vehicle furnaces are often constrained to a single power level and a single fan speed (e.g., on or off). Having only one power level and fan speed has drawbacks. For example, when the furnace is operating, the furnace runs at the maximum power level and the maximum fan speed. Operating at such levels can produce an excessive amount of noise and consume an excessive amount of energy.

Accordingly, systems and methods that obviate one or more of the above-mentioned drawbacks would be beneficial.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a method of operating an air circulation system for a recreational vehicle is provided. The method may include analyzing a temperature profile within a passenger compartment of the recreational vehicle. The method may include transmitting a pulse-input code to the furnace. The pulse-input code may be based on the analyzed temperature profile. The method may include directing operational parameters of the furnace based on the transmitted pulse-input code.

In another exemplary aspect of the present disclosure, an air circulation system for a recreational vehicle air is provided. The air circulation system for a recreational vehicle air may include a thermostat positioned within a passenger compartment. The thermostat may include a temperature sensor. The air circulation system may include a furnace. The furnace may include a fan and a heater. The air circulation system may include a controller operably coupled to the furnace. The controller may be operable for: analyzing a temperature profile within a passenger compartment of the recreational vehicle; transmitting a pulse-input code to the furnace, the pulse-input code being based on the analyzed temperature profile; and directing operational parameters of the furnace based on the transmitted pulse-input code.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
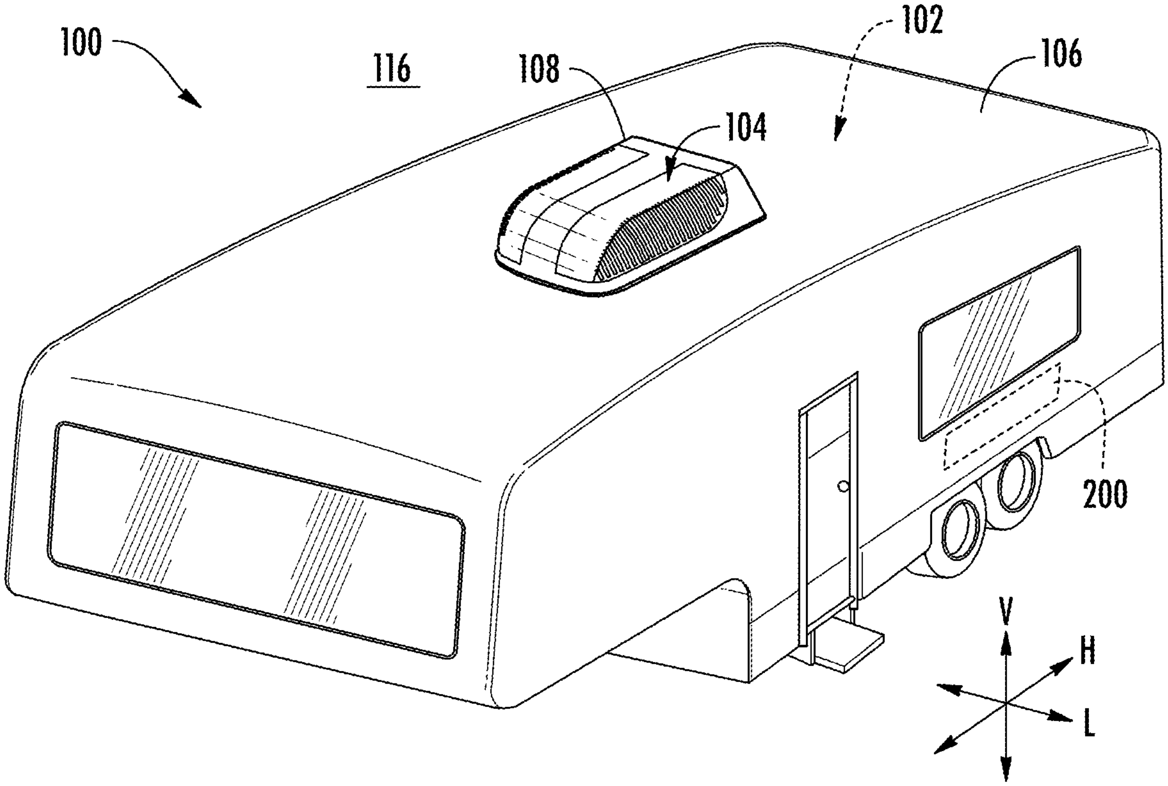
FIG. 1 provides a perspective view of a recreational vehicle according to one or more exemplary embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “includes” and “including” are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, reference to "an embodiment" or "one embodiment"does not necessarily refer to the same embodiment, although it may. Any implementation described herein as "exemplary" or "an embodiment" is not necessarily to be construed as preferred or advantageous over other implementations.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Recreational vehicles can include a furnace (e.g., a gas-powered furnace) for providing heated air to the passenger compartment within the recreational vehicle. The furnace can be controlled by a wall thermostat or a controller. For example, the wall thermostat or the controller can be in operative communication with the furnace. Typically, recreational vehicles include a single wall thermostat that is configured to control the furnace or a rooftop air-conditioner of the recreational vehicle.

Commonly, furnaces are configured to receive a single discrete signal from the wall thermostat or the local controller. For example, existing furnaces may be configured to receive one signal (e.g., an ON or OFF signal) at a time from the wall thermostat or the controller. Due to this, existing recreational vehicle only operate in two states (e.g., an ON state or an OFF state). In the ON state, existing furnaces of recreational vehicles can only operate at a single operating level, such as maximum heat level of the furnace. The lack of variability of the operating state of existing furnaces has drawbacks. For example, when running existing furnaces an excessive amount of noise can be produced (e.g., as the furnace must operate at its maximum working capacity).

Notably, embodiments of the present subject matter provide a method of operating furnace for a recreational vehicle in a multi-stage furnace mode. The multi-stage furnace mode can control the furnace such that the furnace may have variable working capabilities. For example, the multi-stage furnace mode of the furnace may advantageously provide a control sequence that can direct the furnace to operate in a high operating state or a low operating state. The control sequence may advantageously transmit a pulse input code to the furnace. Based on the pulse input code a controller associated with the furnace may control power levels and fan speed levels of the furnace. Accordingly, embodiments of the present subject matter advantageously provide a method of operating a furnace for a recreational vehicle that allows the furnace to effectively meet the heating demands for a recreational vehicle.

FIG. 1 provides a perspective view of an exemplary recreational vehicle 100 in accordance with the present disclosure. People may employ recreational vehicle 100 for a variety of purposes, including transportation, cooking, eating, sleeping, entertaining, and the like. As such, recreational vehicle 100 defines a passenger compartment 102, which may further include a bed, stove, table, restroom, or multiple compartments for storing items that passengers wish to take with them on their travels. Because people often spend significant time within the passenger compartment 102 of recreational vehicle 100, climate control of the passenger compartment is desirable.

Accordingly, an air conditioner 104 may be mounted on recreational vehicle 100 to provide cooled air to the passenger compartment 102. Air conditioner 104 is typically mounted to an outside surface 106 of recreational vehicle 100. This arrangement is desirable because a byproduct of operation of air conditioner 104 is heated air, which has been passed over a heat exchanger to remove heat from the air circulating within passenger compartment 102. During certain operations, this heated air may be exhausted to the ambient air. As shown in the exemplary embodiment of FIG. 1, air conditioner 104 may be mounted on an outer surface 106, such as the ceiling or top of recreational vehicle 100. Also as shown in FIG. 1, air conditioner 104 may include a top cover or outer grill 108 that is positioned over the working components of the air conditioner 104. For example, to protect the working components from rain, wind, debris, or the like. Although an exemplary recreational vehicle is illustrated, it should be appreciated that air conditioner 104 may be used in or with any suitable recreational vehicle.

Figure 2:
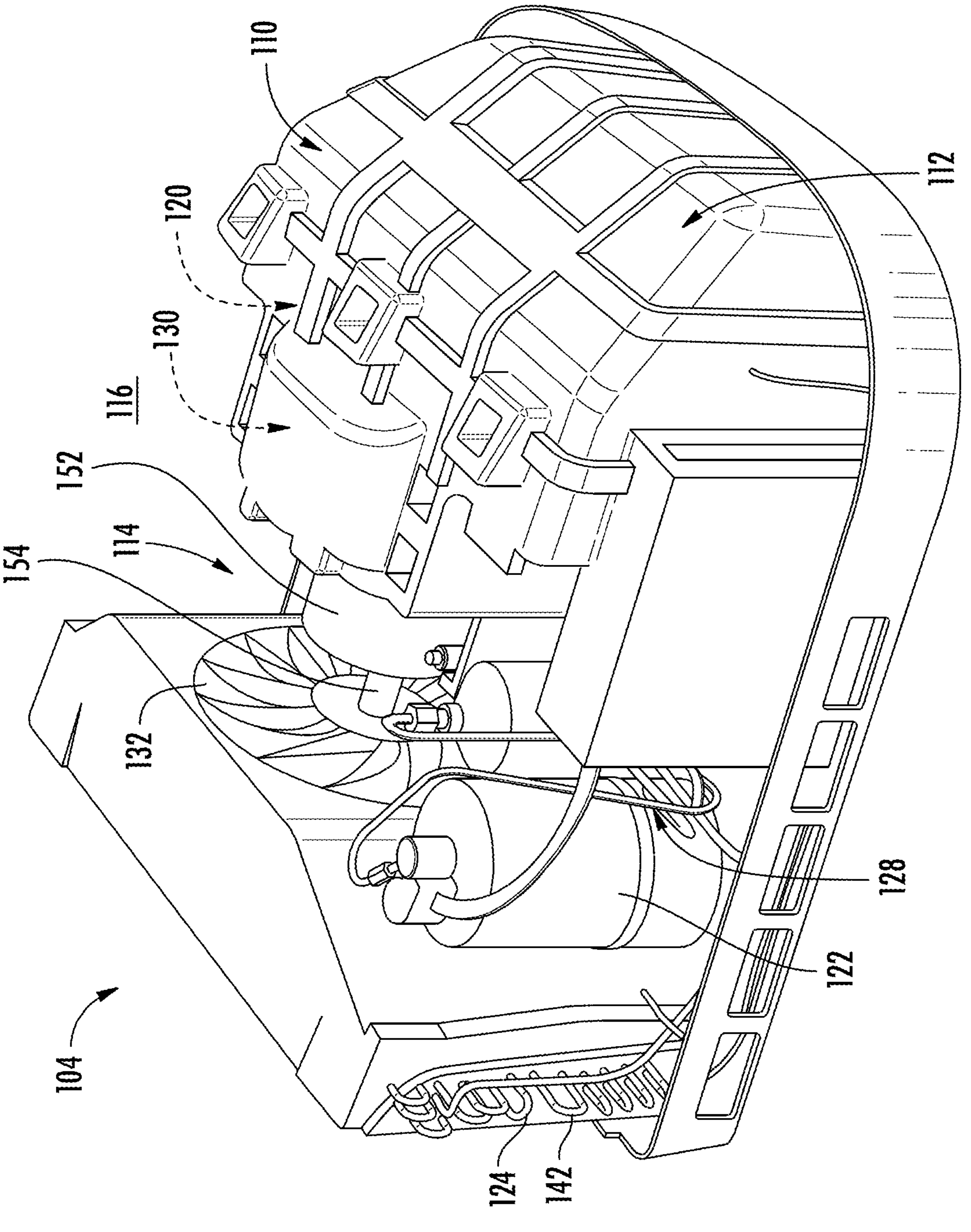
FIG. 2 provides a perspective view of a recreational vehicle air conditioner (RVAC) that may be used with the exemplary recreational vehicle of FIG. 1, with an outdoor cover removed for clarity.
Figure 3:
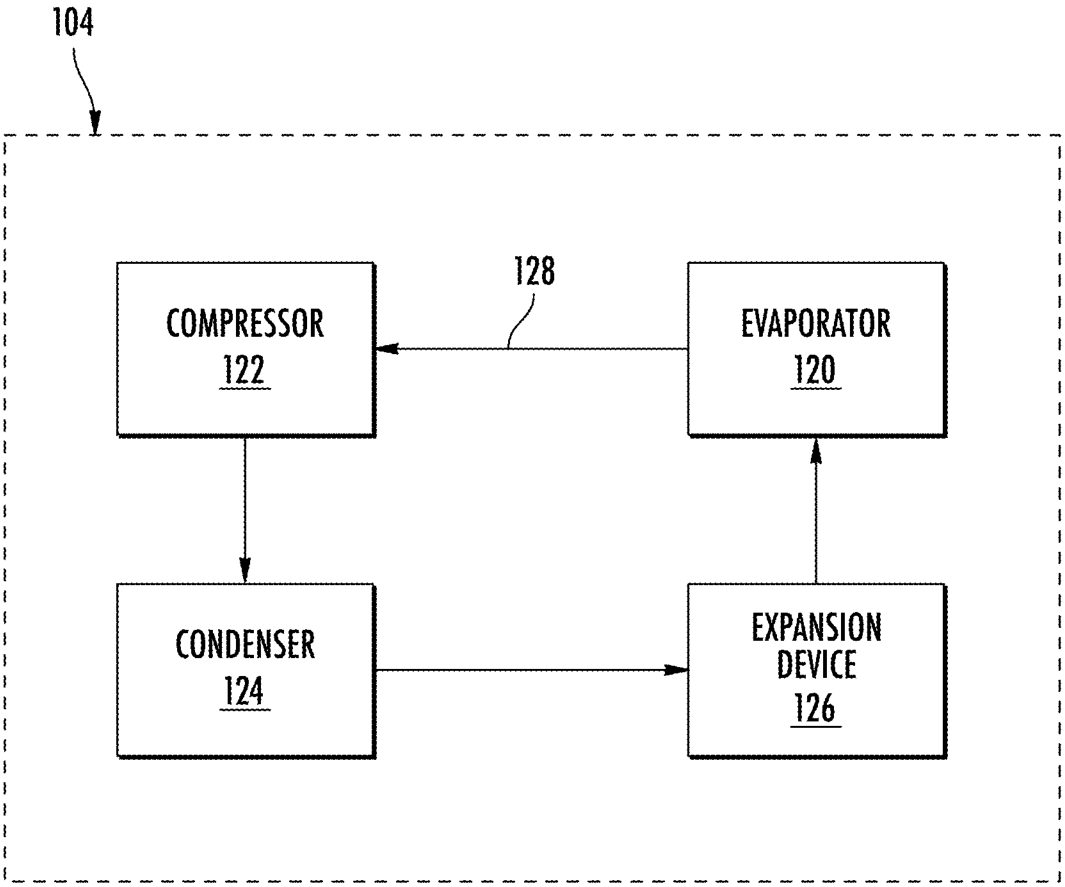
FIG. 3 provides a schematic view of an air conditioner according to one or more exemplary embodiments of the present subject matter.

Referring now generally to FIGS. 2 and 3, the operation of air conditioner 104 will be described in more detail according to exemplary embodiments of the present subject matter. In this regard, FIG. 2 illustrates a top, perspective view of air conditioner 104 of recreational vehicle 100 with outer grill 108 removed to reveal internal working components of air conditioner 104. As illustrated, air conditioner 104 generally includes an indoor bulkhead or indoor cover 110 that divides air conditioner 104 between an indoor and outdoor portion. Specifically, indoor cover 110 defines an indoor air plenum 112 and an outdoor air plenum 114. In this regard, indoor cover 110 generally shields the indoor components of air conditioner 104 from the outdoor environment 116.

In addition, FIG. 3 illustrates a schematic view of air conditioner 104. Relevant components of air conditioner 104 will now be described. It should be understood that air conditioner 104 includes various heat pump components, such as a sealed system, for treating air within an interior of an associated recreational vehicle 100. Such components are well understood by those skilled in the art and a description of such components is omitted for the sake of brevity.

In this regard, for example, air conditioner 104 includes refrigerant circulating between evaporator (or interior heat exchanger) 120, compressor 122, condenser (or exterior heat exchanger) 124, and expansion device 126, as shown in the refrigeration loop 128 of air conditioner 104 in FIGS. 2 and 3. Refrigerant, also known as coolant, carries heat from the passenger compartment 102 of recreational vehicle 100 to the outdoor environment 116 (e.g., ambient area surrounding outer surface 106 of the passenger compartment 102). Refrigerant is useful because it changes states from a liquid to a vapor at convenient temperatures for a refrigeration cycle. One suitable refrigerant for use in refrigeration loop 128 is 1,1,1,2-Tetrafluoroethane, also known as R-134A, although it should be understood that the present disclosure is not limited to such example and that any suitable refrigerant may be utilized. For example, according to an exemplary embodiment, the refrigerant may be R-410A or another refrigerant.

During a refrigerant cycle, the refrigerant may begin by passing through evaporator 120 in liquid form. Ambient air or air from the passenger compartment 102 may pass over evaporator 120, e.g., as motivated by an evaporator fan or air handler. More specifically, air conditioner 104 may include an indoor fan 130 configured for urging a flow of indoor air. According to the illustrated example embodiment, a drive shaft 154 is operably coupled to both indoor fan 130 and outdoor fan 132. In this regard, drive motor 152 may be positioned between the indoor fan 130 and outdoor fan 132 for selectively rotating both fans 130 and 134 during an operating cycle of air conditioner 104.

It should be appreciated that according to alternative embodiments, outdoor fan 134 may include a dedicated motor. It should be further appreciated that air conditioner 104 and refrigeration loop 128 may include additional or alternative components for facilitating a heating or cooling cycle.

Because the liquid refrigerant is relatively cold in this low-pressure state, it absorbs heat from the air passed over it, cooling the air for delivery to the passenger compartment 102. As the liquid refrigerant absorbs heat, it evaporates into a vapor.

From there, the gaseous refrigerant is delivered to compressor 122, which increases the pressure of the refrigerant, thus raising its temperature well-above the ambient temperature outside of recreational vehicle 100. From compressor 122, the heated refrigerant is delivered to condenser 124. Air may pass over condenser 124, e.g., as motivated from a condenser fan or air handler. More specifically, as illustrated, air conditioner 104 may include an outdoor fan 132 configured for urging a flow of outdoor air, thereby facilitating heat transfer from the heated refrigerant to the ambient air. In releasing this heat energy, the refrigerant condenses back into liquid form. Next, the refrigerant is delivered to expansion device 126, where the pressure of the refrigerant is reduced, thus decreasing its temperature. The cooled, liquid refrigerant is then delivered back to evaporator 120 to repeat the process. In some embodiments, evaporator 120 may be referred to as a first heater.

Figure 4:
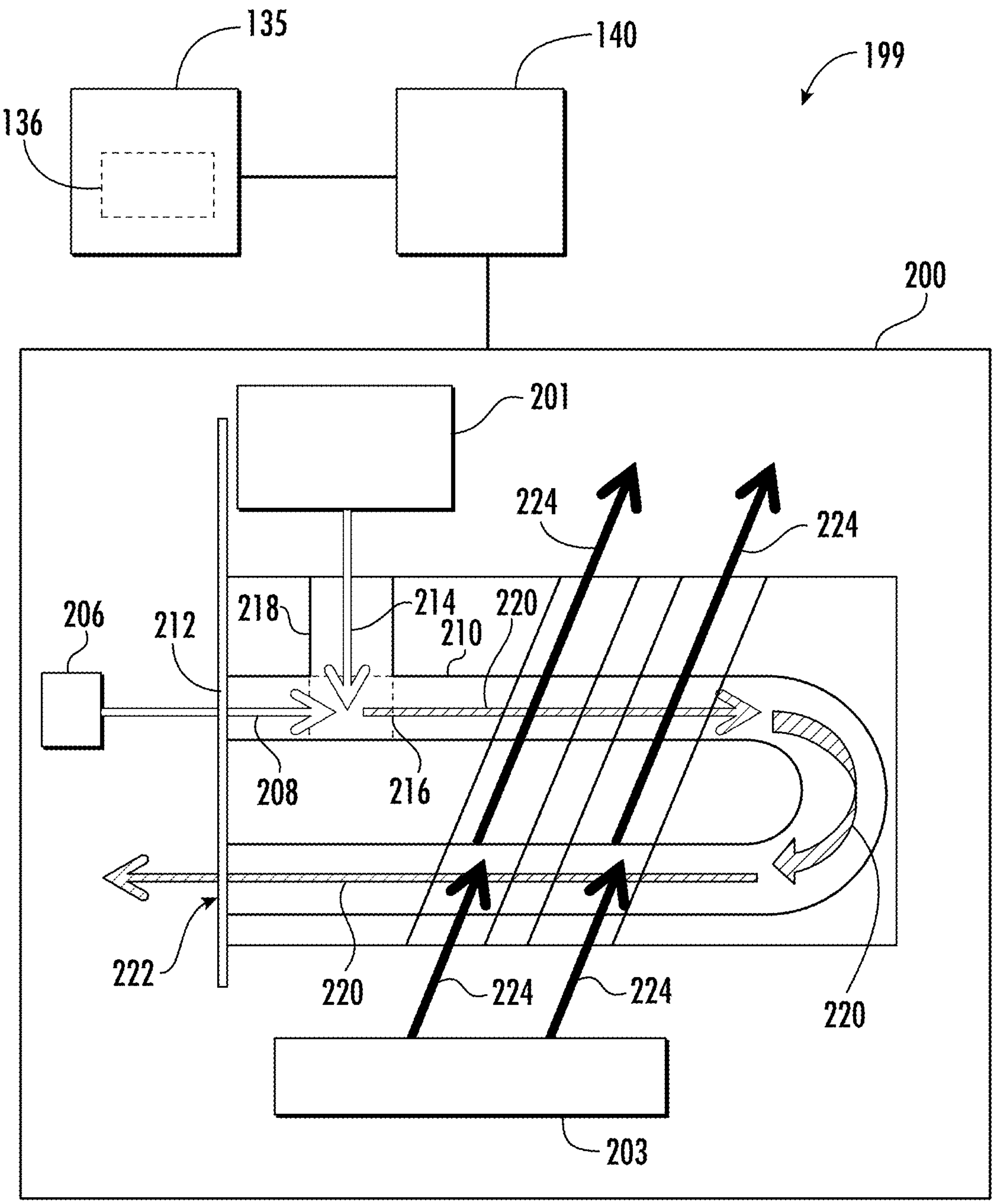
FIG. 4 provides a schematic view of an air circulation system according to one or more exemplary embodiments of the present subject matter.

In addition, the recreational vehicle 100 may include an auxiliary air circulation system 199 to circulate heated air produced by a furnace 200 throughout the passenger compartment 102 of the recreational vehicle 100. Referring now to FIG. 4, the operation of auxiliary air circulation system 199 will be described in more detail according to one or more exemplary embodiments of the present subject matter. The auxiliary air circulation system 199 may generally include the thermostat 135, a controller 140, and the furnace 200. The thermostat 135, the controller 140, and the furnace 200 all may be operably coupled (e.g., electrically or wirelessly coupled).

Thermostat 135 may allow a user to control one or more air circulation systems of the recreational vehicle 100 (e.g., air conditioner 104 or the furnace 200). Thermostat 135 may include a digital screen [e.g., a liquid crystal display (LCD) screen] on which a set temperature or a measured temperature (e.g., measured by the temperature sensor 136) may be displayed. Thermostat 135 may further include one or more control inputs; such as buttons, wheels, or knobs, through which the user may adjust settings. For instance, a user operating the thermostat 135 may select a set temperature desired within recreational vehicle 100.

In some embodiments, an interior temperature sensor 136 is provided onboard the thermostat 135. The thermostat 135 may be provided within the passenger compartment 102. For example, the thermostat 135 may be positioned on a wall within the passenger compartment 102. During use, interior temperature sensor 136 may generally sense or measure a contemporary interior temperature (e.g., an ambient or atmospheric temperature) within passenger compartment 102. Interior temperature sensor 136 may then transmit the contemporary interior temperature information (e.g., in response to a received polling request or according to a set polling interval, schedule, or rate) to controller 140 (e.g., as one or more interior temperature signals). Interior temperature sensor 136 may be any suitable sensor for measuring the temperature of the air (e.g., thermistor, thermostat, or the like). Accordingly, a contemporary interior temperature of passenger compartment 102 may be continually monitored (e.g., during activation or use of air conditioner 104).

Controller 140 may control various operations within recreational vehicle 100. For example, the controller 140 may control various operations of the furnace 200. Controller 140 may be provided at any suitable location within recreational vehicle 100, and may be operably coupled (e.g., electrically or wirelessly coupled) to furnace 200. In some embodiments, controller 140 includes one or more memory devices and one or more processors. The processors can be any combination of general or special purpose processors, CPUs, or the like that can execute programming instructions or control code associated with operation of recreational vehicle 100. The memory devices (e.g., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 140 may be constructed without using a processor, for example, using a combination of discrete analog or digital logic circuitry (such as switches, amplifiers, integrators, comparators, flip-flops, AND gates, and the like) to perform control functionality instead of relying upon software.

As will be appreciated in more detail below, the controller 140 may be configured to direct the furnace 200 in a multi-stage furnace mode. In the multi-stage furnace mode, the controller 140 may variably control the power level of a heater 201 or the fan speed level of a fan 203. Existing furnaces do not variably control the power level of the heater or the fan speed level of the fan. For example, existing furnaces are configured to operate in either an ON state (e.g., a state of the furnace corresponding to a maximum power level and a maximum fan speed) or an OFF state (e.g., a state of the furnace corresponding to a zero-power level and a zero-fan speed). Notably, as will be appreciated in more detail below, embodiments of the present subject matter advantageously provide a control sequence that directs furnaces for recreational vehicles to operate in a high operating state or a low operating state.

The furnace 200 may provide auxiliary (e.g., additional) heat to recreational vehicle 100 at times when evaporator 120 is unable to do so on its own. The furnace 200 may be a gas-powered furnace. For example, the furnace 200 may be powered by a gas such as propane, natural gas, or the like. Referring still to FIG. 4, the furnace 200 may include a blower motor 206. The blower motor 206 may draw a flow of return air 208 into a main duct 210 of the furnace 200 via a combustion inlet 212. For example, the blower motor 206 may include or be configured as a permanent split-capacitor motor, an electronically commutated motor, a variable speed motor or the like that may urge or motivate the flow of return air 208 into a main duct 210 via the combustion inlet 212.

In some embodiments, the heater 201 includes a tank for containing a volume of gas therewithin. The heater 201 may be operable to urge a flow of gas 214 into a combustion chamber 216 of the furnace 200 via a gas duct or line 218. In some embodiments, the heater 201 also includes a control valve (e.g., a solenoid valve, a ball valve, or the like) in downstream communication with the tank. The control valve may regulate the flow rate of the flow of gas 214. In some embodiments, the controller 140 is operably coupled to the control valve. In such embodiments, the controller 140 may control the flow of gas 214 via the control valve.

The flow rate of the control valve may determine or correspond to a power output level of the heater 201. The flow of return air 208 from the blower motor and the gas from the tank may mix and ignite within a combustion chamber 216 within the furnace 200 to produce a flame 220. The flame 220 may be routed through the main duct 210 to or toward an exhaust 222 of the furnace 200. The power level of the heater 201 may correspond to a temperature or intensity of the flame 220.

As will be appreciated in more detail below, the controller 140 may be operable to direct the heater 201 to operate at a high-power level or a low-power level. The high-power level may correspond to the maximum power output that the heater 201 may produce. For example, when operating at the high-power level, the controller 140 may direct the control valve to fully open. Thus, a maximum flow rate of the flow of gas 214 gas may be direct to the combustion chamber 216.

The low power level may correspond to a power output that is less than fifty percent (50%) of the maximum power output, such as less than thirty five percent (35%) of the maximum power output, such as less than fifteen percent (15%) of the maximum power output. For example, when operating at the low-power level, the controller 140 may direct the control valve to open partially such that the flow of gas 214 is less than fifty percent (50%) of the maximum flow rate.

The fan 203 of the furnace 200 may urge a flow of return air 224 around the outside of the main duct 210 containing the flame 220. The heat generated by the flame 220 within the main duct 210 may heat the flow of return air 224 prior to the flow of return air 224 entering the passenger compartment 102 of the recreational vehicle 100. The controller 140 may be operable to control the fan speed of the fan 203. The fan speed may determine the flow rate of the flow of return air 224 that is being directed over the main duct 210. As will be appreciated in more detail below, the controller 140 may be operable to direct the fan 203 to operate at a high fan speed or a low fan speed. For example, the controller 140 may control an amount of power delivered to the fan 203. The amount of power delivered to the fan 203 may correspond to the fan speed. For example, when operating at a high fan speed, the controller 140 may deliver a maximum amount of power (e.g., power from a power source such as battery or a generator) to the fan 203. Thus, a maximum fan speed may be achieved.

As another example, when operating at the low fan speed, the controller 140 may allow less than fifty percent (50%) of the maximum amount of power to be delivered to the fan, such as less than thirty five percent (35%) of the maximum amount of power to be delivered to the fan, such as less than fifteen percent (15%) of the maximum amount of power to be delivered to the fan. Thus, a low fan speed may be achieved.

Notably, embodiments of the present subject matter provide a method of operating an air circulation system for a recreational vehicle. Specifically, embodiments of the present subject matter advantageously provide a method of operating an auxiliary air circulation system in a multi-stage furnace mode. As will be appreciated in more detail below, the multi-stage furnace mode includes a control sequence that is configured to transmit a pulse-input code from a thermostat or a local controller a furnace (e.g., to a computing device on board the furnace) for a predetermined amount of time. Existing furnaces for recreational vehicles typically include a discrete electrical signal input. Due to the discrete electrical signal input, existing furnaces can only receive one input signal at a time. Thus, existing furnaces of recreational vehicles only operate in two states (e.g., an ON state or an OFF state). In the ON state of existing furnaces, the heater and the fan operate at their full capacity. This can cause difficulties for a user. For example, existing furnaces of recreational vehicles typically produce excessive noise in the ON state. As another example, existing furnaces of recreational vehicles typically use an excessive amount of gas or energy in the ON state. Methods of the present subject matter can direct furnaces with a discrete electrical signal input to operate at a variety of levels (e.g., a variety of power levels or fan speed levels). Specifically, the pulse-input code transmitted to the furnace can direct the furnace to perform in a high operating state or a low operating state. Notably, existing recreational vehicles can be retrofitted to operate in the multi-stage furnace mode. For example, the control sequence for the multi-stage furnace mode may be loaded into the memory of a controller associated with existing furnaces. This may advantageously allow furnaces of existing recreational vehicles to operate at a variety of states.

Figure 5:
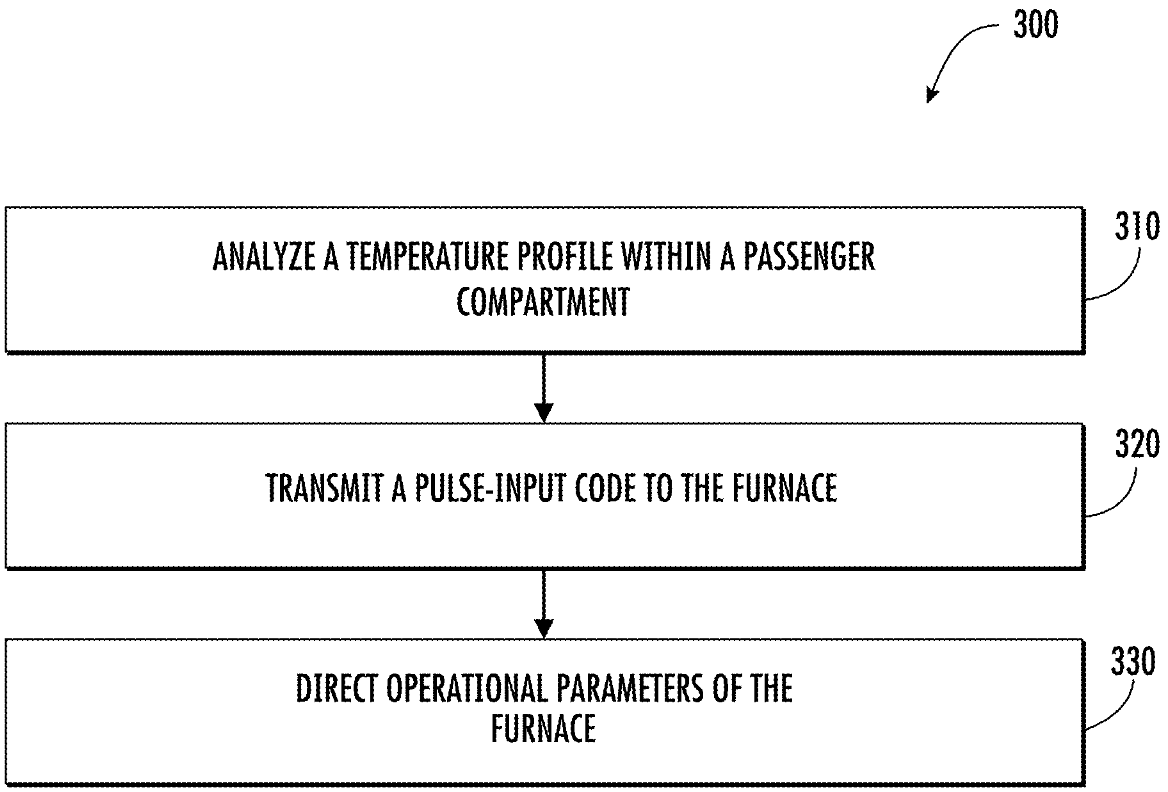
FIG. 5 provides a flow chart illustrating a method of operating an air circulation system according to one or more exemplary embodiments of the present subject matter.

Referring now to FIG. 5, a flow chart describing an exemplary method of operating an air circulation system is provided. Specifically, FIG. 5 illustrates a method 300 of operating an auxiliary air circulation system in a multi-stage furnace mode. It should be understood that the method 300 described herein may be used by a wide range of air circulation systems for recreational vehicles, and the association thereof should not be limited. In some embodiments, the method 300 includes inputting a heating mode into a thermostat. For example, a user may input a heating mode into the thermostat defining how the user would like the recreational vehicle to be heated. In other words, the user may activate a heating operation to provide heat to the passenger compartment of the recreational vehicle. In some embodiments, this may include the user inputting a set temperature at which the user desires the passenger compartment to be maintained. Once the thermostat has been activated, the method 300 may proceed to step 310.

At 310, the method 300 may include analyzing a temperature profile within a passenger compartment of the recreational vehicle. The temperature profile may include information indicating a target temperature within the passenger compartment. The target temperature may be a set temperature, such as a temperature set by a user on the thermostat provided within the passenger compartment of the recreational vehicle. In addition, the temperature profile may include information indicating a contemporary temperature within the passenger compartment. The contemporary temperature may be a measured or a sensed temperature. For example, the contemporary temperature may be measured or sensed by a temperature sensor provided within the passenger compartment. The temperature sensor may be onboard or in operative communication with the thermostat provided within the passenger compartment.

In some embodiments, at 310, analyzing the temperature profile includes determining, at the thermostat, the target interior temperature for the passenger compartment of the recreational vehicle. As mentioned above, the target interior temperature may be a user set temperature. For example, the user may manipulate input controls on the thermostat to set the target interior temperature. In addition, in some embodiments, at 310, analyzing the temperature profile includes analyzing an contemporary interior temperature within the recreational vehicle in response to determining the target interior temperature for the recreational vehicle. Analyzing the contemporary interior temperature may include sensing or measuring, with the temperature sensor, the contemporary interior temperature within the passenger compartment. For example, the interior temperature sensor may take a measurement of the temperature of air within the passenger compartment.

Moreover, at 310, the method 300 may include determining a temperature difference between the contemporary interior temperature and the target interior temperature. For example, the contemporary interior temperature measurement may be sent to a controller in operative communication with the air circulation system. The controller may compare the difference (e.g., between the contemporary interior temperature and the target interior temperature) to a predetermined threshold. The predetermined threshold may correspond to a temperature differential. For example, the predetermined threshold may correspond to a number of degrees away from the target interior temperature that was set.

As a non-limiting example, the target interior temperature set may be seventy-two degrees (72° F.). The predetermined threshold may correspond to a temperature three degrees Fahrenheit (3° F.) below the target interior temperature. If the contemporary interior temperature is less than the predetermined temperature threshold [e.g., less than sixty-nine degrees Fahrenheit (69° F.)] the temperature difference may be determined to be outside of the predetermined threshold. If the temperature difference is within this range [e.g., between sixty-nine degrees Fahrenheit (69° F.)], the temperature difference may be determined to be inside of the predetermined threshold.

In some embodiments, the furnace may be directed to operate at a high operating level in response to the temperature difference being outside of the predetermined threshold. The high operating level of the furnace may be utilized to quickly bring the contemporary interior temperature within the passenger compartment to the target interior temperature. For example, when operating at the high operating level the fan of the furnace may be directed to operate at a maximum fan speed and a heater of the furnace may be directed to operate at a maximum power level to quickly bring the contemporary interior temperature to the target interior temperature.

In some other embodiments, the furnace may be directed to operate at a low operating level in response to the temperature difference being inside the predetermined threshold. The low operating level of the furnace may be utilized to bring the contemporary interior temperature to the target interior temperature. As the contemporary interior temperature within the passenger compartment is inside the predetermined threshold, a lower power level of the heater of the furnace and a lower fan speed of the fan of the furnace (e.g., when compared to the power level of the heater and the fan speed of the fan when operating in a high operating level) may be utilized to bring the contemporary interior temperature to the target interior temperature. Advantageously, when operating at the low operating level, the furnace may produce less noise (e.g., when compared operating in the high operating level) and may utilize less energy (e.g., when compared to operating in the high operating level).

At step 320, the method 300 may include transmitting a pulse-input code to the furnace, and more particularly, to a computing device onboard the furnace. The pulse-input code may be indicative of a number of input signals transmitted to the controller. In some embodiments, transmitting the pulse-input code includes pulsing an input signal to the controller associated with the furnace. Pulsing the input signal may include temporarily changing an amplitude of the input signal. For example, pulsing the input signal includes temporarily changing the amplitude of the input from a baseline amplitude to a higher or lower value amplitude. The baseline amplitude may indicate an OFF state of the furnace. The higher or lower amplitude may indicate an ON state of the furnace.

In some embodiments, the method 300, at 320, includes recording, at the computing device onboard the furnace, a number of input signals transmitted over a predetermined amount of time. The predetermined time may be a number of seconds that the controller may record input signals transmitted from the controller or received at the furnace. For example, the predetermined amount of time may be five seconds. As another example, the predetermined amount of time may be less than ten seconds, such as about eight seconds, such as about six seconds, or the like. The predetermined amount of time may be measured via a timer. For example, the controller may start the time (e.g., a countdown timer) after transmitting the pulse-input code. For example, the number of times the controller transmits a signal indicative of the ON state of the furnace may be recorded within a memory of the controller.

When it is determined, at 310, that temperature difference is outside of the predetermined threshold, the method 300, at 320, may include pulsing a first pulse count to the furnace within the predetermined amount of time. Pulsing the first pulse count may include transmitting a signal pulse to the furnace an odd number of times within the predetermined amount of time. For example, pulsing the first pulse count may include transmitting one signal pulse to the furnace within the predetermined amount of time. For instance, at 320, the thermostat or the controller may transmit one ON signal pulse to the computing device onboard the furnace within the predetermined amount of time. The odd number of ON signal pulses transmitted (e.g., within the predetermined amount of time) may indicate that the furnace is to operate at the high operating level.

When it is determined, at 310, that the temperature difference is inside of the predetermined threshold, the method 300, at 320, may include pulsing as second pulse count to the furnace within the predetermined amount of time. Pulsing the second pulse count may include transmitting a signal pulse to the furnace an even number of times within the predetermined amount of time. For example, pulsing the second pulse count may include transmitting two signal pulses to the furnace within the predetermined amount of time. For instance, the thermostat or the controller may transmit an ON signal pulse, then may halt the ON signal pulse (e.g., by changing the amplitude of the signal to indicate an OFF state), then another ON signal pulse to the furnace within the predetermined amount of time. The even number of ON signal pulses transmitted to the furnace (e.g., within the predetermined amount of time) may indicate that the furnace is operate at the low operating level.

At step 330, the method 300 may include controlling operational parameters of the furnace based on the pulse-input code transmitted to the furnace (e.g., at 320). If it is determined, at 310, that the difference is outside of the predetermined threshold a high operating state of the furnace may be adopted to meet the air conditioning demand. If the high operating state of the furnace is adopted, the thermostat or the controller may transmit a signal pulse an odd number of times to the furnace. If the number of signal pulses transmitted is odd (e.g., one), controlling the operational parameters of the furnace may include operating the furnace at the high operating level. Operating the furnace at the high operating level may include operating the heater of the furnace at a high power level. For example, a control valve of the heater may be directed to be fully opened such that a maximum flow of gas can be delivered to a combustion chamber of the furnace. In addition, operating the furnace in the high operating level may include operating the fan of the furnace at the high fan speed. For example, a maximum amount of power may be delivered to the fan such that fan blades of the fan may rotate at their maximum rotation speed. A flow of return air may be delivered to the combustion chamber of the furnace. The flow of return air and the flow of gas may mix and ignite to form a flame having the maximum heat output level.

If it is determined, at 310, that the difference is inside of the predetermined threshold a low operating level of the furnace may be adopted. If the low operating level of the furnace is adopted the thermostat or the controller may transmit a signal pulse an even number of times to the furnace. If the number of signal pulses transmitted is even (e.g., two), controlling the operational parameters of the auxiliary heat may include operating the furnace at a low operating level. Operating the furnace in the low operating state may include operating the heater of the furnace at a low power level. For example, the control valve may be directed to open partially such that a flow rate of the flow of gas delivered to the combustion chamber of the furnace is less than fifty percent (50%) of the maximum flow rate, such as than thirty five percent (35%) of the maximum flow rate, such as less than fifteen percent (15%) of the maximum flow rate. In addition, operating the furnace at the low operating level may include operating the fan of the furnace at the low fan speed. When operating at the low fan speed, the controller may direct less than fifty percent (50%) of the maximum amount of power to be delivered to the fan, such as less than thirty five percent (35%) of the maximum amount of power to be delivered to the fan, such as less than fifteen percent (15%) of the maximum amount of power to be delivered to the fan. Thus, a low fan speed may be achieved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an air circulation system for a recreational vehicle, the air circulation system comprising a furnace, the method comprising:

analyzing a temperature profile within a passenger compartment of the recreational vehicle;

transmitting a pulse-input code to the furnace, the pulse-input code being based on the analyzed temperature profile, wherein transmitting the pulse-input code comprises recording a number of input signals transmitted over a predetermined amount of time; and directing operational parameters of the furnace based on the transmitted pulse-input code.

2. The method of claim 1, wherein the predetermined amount of time corresponds to a time interval, and wherein the time interval is less than ten seconds.

3. The method of claim 1, wherein analyzing the temperature profile comprises, determining a target interior temperature for the passenger compartment, and analyzing a contemporary interior temperature within the passenger compartment following determining the target interior temperature for the passenger compartment.

4. The method of claim 3, wherein analyzing the contemporary interior temperature within the passenger compartment comprises, sensing the contemporary interior temperature within the passenger compartment, and determining a temperature difference between the contemporary interior temperature and the target interior temperature.

5. The method of claim 4, wherein transmitting the pulse-input code comprises pulsing a first pulse count in response to determining the temperature difference is outside of a predetermined threshold.

6. The method of claim 5, wherein the pulsing the first pulse count comprises transmitting one signal pulse to the furnace.

7. The method of claim 5, wherein controlling operational parameters of the furnace comprises, operating a heater of the furnace at a maximum power level following pulsing the first pulse count, and operating a fan of the furnace at a maximum speed level following pulsing the first pulse count.

8. The method of claim 4, wherein transmitting the pulse-input code comprises pulsing a second pulse count in response to determining the temperature difference is inside of a predetermined threshold.

9. The method of claim 8, wherein pulsing a second pulse count comprises transmitting two signal pulses to the furnace.

10. The method of claim 8, wherein controlling operational parameters of the furnace comprises, operating a heater of the furnace at less than fifty percent of the maximum power level following pulsing the second pulse count, and operating a fan of the furnace at less than fifty percent of the maximum fan speed level following pulsing the second pulse count.

11. An air circulation system for a recreational vehicle, the air circulation system comprising:

a thermostat positioned within a passenger compartment, the thermostat comprising a temperature sensor;

a furnace comprising a fan and a heater; and a controller operably coupled to the furnace, the controller being operable for:

analyzing a temperature profile within a passenger compartment of the recreational vehicle;

transmitting a pulse-input code to the furnace, the pulse-input code being based on the analyzed temperature profile, wherein transmitting the pulse-input code comprises recording a number of input signals transmitted over a predetermined amount of time; and directing operational parameters of the furnace based on the transmitted pulse-input code.

12. The air circulation system of claim 11, wherein the predetermined amount of time corresponds to a time interval, and wherein the time interval is less than ten seconds.

13. The air circulation system of claim 11, wherein analyzing the temperature profile comprises, determining a target interior temperature for the passenger compartment, and analyzing a contemporary interior temperature within the passenger compartment following determining the target interior temperature for the passenger compartment.

14. The air circulation system of claim 13, wherein analyzing the contemporary interior temperature within the passenger compartment comprises, sensing the contemporary interior temperature within the passenger compartment, and determining a temperature difference between the contemporary interior temperature and the target interior temperature.

15. The air circulation system of claim 14, wherein transmitting the pulse-input code comprises, pulsing a first pulse count in response to determining the temperature difference is outside of a predetermined threshold.

16. The air circulation system of claim 15, wherein controlling operation parameters of the furnace comprises, operating a heater of the furnace at a maximum power level following pulsing the first pulse count, and operating a fan of the furnace at a maximum fan speed level following pulsing the first pulse count.

17. The air circulation system of claim 14, wherein transmitting the pulse-input code comprises pulsing a second pulse count in response to determining the temperature difference is inside of a predetermined threshold.

18. The air circulation system of claim 17, wherein controlling operational parameters of the furnace comprises, operating a heater of the furnace at less than fifty percent of the maximum power level following pulsing the second pulse count, and operating a fan of the furnace at less than fifty percent of the maximum fan speed level following pulsing the second pulse count.

* * * * *